N. SCHENK.
VEHICLE WHEEL.
APPLICATION FILED JULY 18, 1910.
1,019,845.
Patented Mar. 12, 1912.
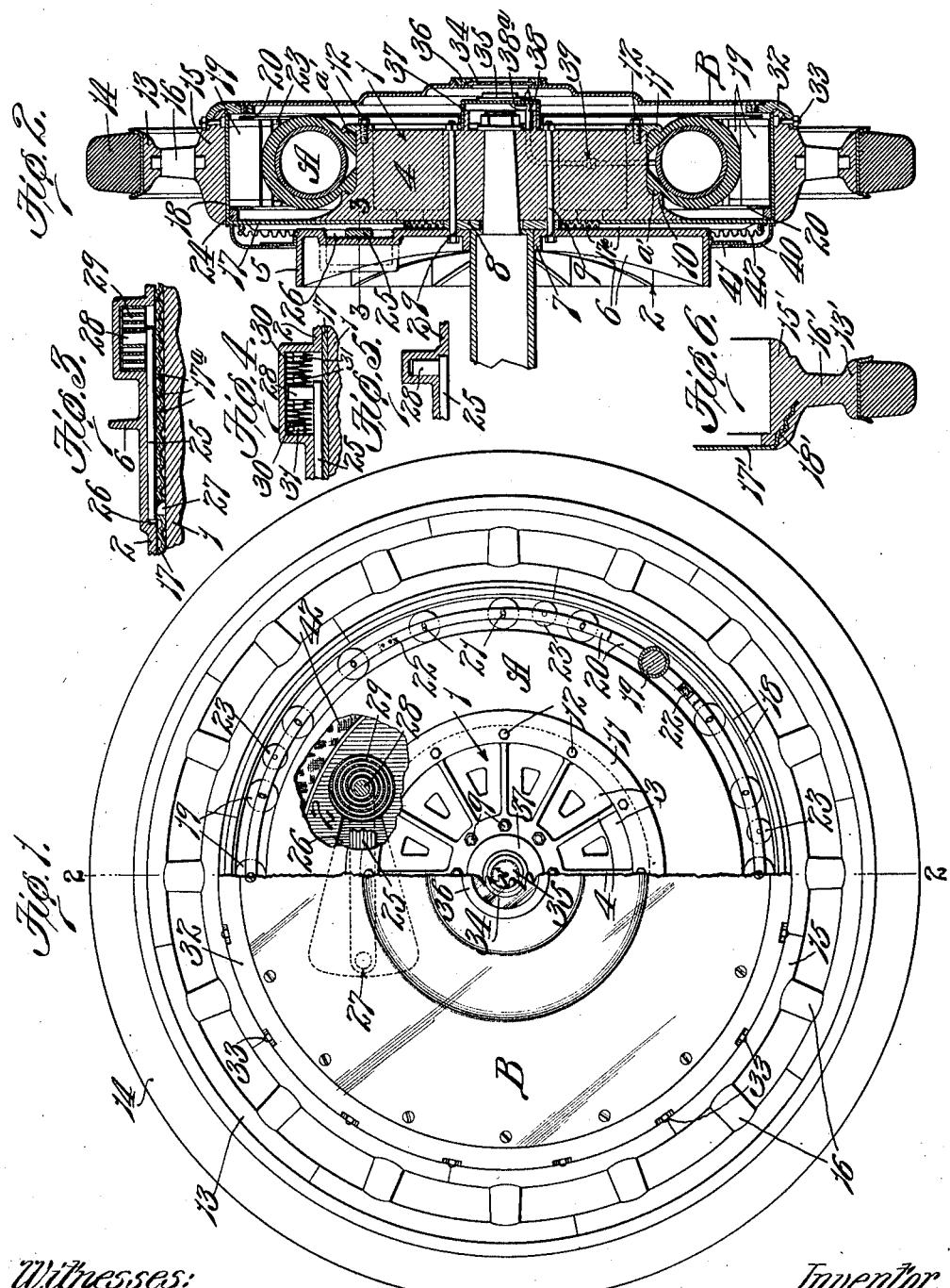

UNITED STATES PATENT OFFICE.

NICHOLAS SCHENK, OF ST. LOUIS, MISSOURI.

VEHICLE-WHEEL.

1,019,845.

Specification of Letters Patent.  Patented Mar. 12, 1912.

Application filed July 18, 1910. Serial No. 572,498.

*To all whom it may concern:*

Be it known that I, NICHOLAS SCHENK, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same.

This invention relates to vehicle wheels of that type which are provided with a cushion arranged between a hub section and a rim section that can move relatively to each other in a vertical plane.

One object of my present invention is to provide a wheel of the type referred to that comprises fewer parts than the wheels of this type which have heretofore been in use, and which is so constructed that the cushion can be removed or arranged in operative position easily.

Another object is to provide a strong and serviceable wheel having a relatively large hub that supports the cushion and which coöperates with a member on the rim section to retain the hub and rim sections in vertical alinement with each other.

Another object is to provide a wheel of the type referred to in which the means that transmits rotary movement from one section to the other is of novel construction.

Another object is to provide a wheel having means for absorbing the shocks to which one section is subjected when the other section of the wheel is started and stopped suddenly or subjected to twisting strains. And still another object is to provide a wheel of the type referred to in which the hub section consists of a relatively large hub and a brake member that are spaced away from each other so as to form a pocket in which a part of the rim section slides or telescopes.

Other objects and desirable features of my invention will be hereinafter pointed out.

Figure 1 is a side elevational view partly in vertical section of a wheel constructed in accordance with my invention; Fig. 2 is a vertical sectional view of said wheel; Fig. 3 is a detail sectional view taken on approximately the line 3—3 of Fig. 2; Figs. 4 and 5 are detail sectional views illustrating means of slightly different construction from that shown in Fig. 1 for transmitting rotary movement from one section of the wheel to the other; and Fig. 6 is a detail sectional view illustrating a slightly modified form of rim section.

The wheel herein shown is adapted to be used on the rear axle of an automobile or other vehicle having an axle drive but I do not wish it to be understood that my invention is limited to a rear wheel or to a wheel which is adapted to be fixed or securely connected to a driven axle for, if desired, the hub section of the wheel could be provided with a sprocket or other suitable means for coöperating with the driving member.

In the preferred form of my invention as herein shown, the hub section of the wheel is made up of a relatively large hub 1, and a brake member 2 whose vertical wall is spaced away from the adjacent side face of the hub 1 so as to form a pocket in which a part of the rim section is telescoped or slidingly mounted. The hub 1 is preferably formed of cast metal and is provided with recesses or pockets 3 so as to lighten same, said pockets being separated from each other by means of radially disposed ribs 4, as shown in Fig. 1. The brake member 2 is provided with a flange 5 which is adapted to coöperate with a brake, not shown, and a number of radially disposed ribs 6 are arranged between said flange and a flange 7 at the center of said brake member through which the axle passes. The hub 1 and brake member 2 are held spaced away from each other by means of a collar 8, as shown in Fig. 2, and bolts or other suitable fastening devices 9 pass through said parts so as to securely connect them together. I do not wish it to be understood, however, that my invention is limited to a wheel having a hub section formed in the exact manner herein illustrated for the parts which constitute the hub section could be constructed in various other ways without departing from the spirit of my invention. Furthermore, while I have stated that one part of the hub section consists of a brake member it will, of course, be understood that when the wheel is used on the front axle of a vehicle the flange 5 on the member 2 will be omitted.

A cushion A of any preferred type, preferably a pneumatic cushion, is removably mounted on the hub 1, the cushion herein shown consisting of an inflated inner tube and a split outer casing surrounding said tube and provided on its longitudinal edges with beads $a'$ which coöperate with a shoulder 10 on the hub 1 and with a clamping ring 11 that is detachably connected to said hub by means of fastening devices 12. Any other suitable means than that herein shown could be used, however, for connecting the cushion A to the hub, and any other suitable kind of a cushion could be used for absorbing the shocks of the rim section. I prefer the construction herein illustrated, however, on account of its simplicity and the ease with which the cushion can be removed or arranged in operative position.

The rim section of the wheel comprises a felly 13 on which a tire 14 is mounted, a ring-shaped member 15 arranged inside of the felly and connected thereto by means of spokes 16 and an annular or ring-shaped plate 17 projecting inwardly from one edge of the member 15 and telescoped between the hub 1 and the brake member 2 or similar part that is connected to the hub. The felly 13, ring-shaped member 15 and spoke 16 can either be formed of wood or said parts can be formed of metal and integrally connected together, as shown in Fig. 6, the reference characters 13′, 15′ and 16′ in Fig. 6 designating, respectively, the felly, the ring-shaped member arranged inside of same, and the spokes of a cast metal rim section. The annular-shaped plate 17 of the rim section which telescopes between the parts of the hub section and thus holds the two sections in vertical alinement with each other can either be provided at its outer edge with a laterally projecting flange 18 arranged inside of the member 15 and connected thereto or said plate can be connected to the member which carries same in the manner shown in Fig. 6, namely, the plate 17′ can be provided at its outer edge with a crimped portion 18′ which is embedded in the member 15′.

A number of devices, preferably rollers 19, are arranged between the cushion A and the rim section of the wheel, and said devices are connected together in such a manner that they can travel around the cushion or shift relatively thereto and thus prevent the cushion from wearing out as would be apt to occur if said devices always contacted with the same portions of the cushion. The means herein shown for connecting the rollers together consists of a pair of hoops or rings 20 provided with elongated slots which receive journals or trunnions 21 on the opposite ends of the rollers, and tie-bars 22 which connect said hoops together so as to prevent the rollers from twisting or assuming any other than an absolutely transverse position with reference to the rim section on which they bear. The hoops 20 are provided with a number of small wheels or rollers 23 which bear against the ring-shaped member 15 of the rim section or against the flange 18 of the plate 17 if the rim section is constructed in the manner illustrated in Fig. 2, so as to prevent the hoops 20 from moving inwardly or outwardly relatively to the rim section when the wheel is in service, the slots in said hoops which receive the trunnions on the rollers 19 being of sufficient length, however, to permit said rollers 19 to move relatively to the hoops when the hub and rim sections move relatively to each other when the wheel strikes an obstruction in the surface over which it is traveling. The rollers 19 can be of any preferred shape in cross section and formed from any suitable material, and a ring 24 is arranged adjacent the point where the flange 18 branches laterally from the plate 17, as shown in Fig. 2, so as to limit the transverse movement of the rollers 21 in one direction, the transverse movement of said rollers in the opposite direction being limited by means of a cap or cover plate hereinafter described which forms the outside face of the wheel. The plate 17 which holds the hub and rim section in vertical alinement with each other can either be formed from a flat sheet of metal that possesses the proper strength to prevent it from bending laterally or, if desired, said plate can be provided with radially extending ribs or corrugations 17ª, as shown in Fig. 3, so as to impart sufficient strength thereto when a comparatively thin sheet of metal is used to form said plate. One of the advantages of using a comparatively thin corrugated plate for holding the hub and rim section in vertical alinement with each other is that it is much lighter than a flat plate which would be strong enough to stand up under service, and another advantage of using a corrugated plate is that friction between same and the parts of the hub section against which it bears is reduced to a minimum as the entire surface of the plate does not contact with the walls of the pocket in which it is arranged.

The rotary movement of the hub section is transmitted to the rim section by means of one or more links 25 connected to said hub and rim sections in such a manner that a direct pull is exerted on the rim section. The wheel herein shown is provided with only one link but I wish it to be understood that it is immaterial so far as my invention is concerned whether the wheel is provided with one link or a plurality of links. A pocket 26 is formed in the inner face of the vertical wall of the brake member 2 for receiving the link 25, as shown clearly in Figs. 2 and 3, and said link is provided at one of its ends with a trunnion 27 that projects into an opening in the plate 17 and at its opposite end with a trunnion 28 which connects it to the brake member 2.

The link 25 is connected to the rim section at a point directly in rear of the point at which said link is connected to the hub section so that said link will exert a direct pull on the rim section without pulling said rim section inwardly or toward the axis of the wheel. In other words, the pivotal connection between the link and the rim section is approximately the same distance from the axis of the wheel as the pivotal connection between the link and the hub section. The chief advantage of such a construction is that it securely locks the two sections of the wheel together, and transmits movement directly from one section to the other. And another advantage is that it does not increase the strain or friction on the cushion as would occur if the link was connected to the rim section at a point outside of the cushion or at a greater distance from the axis of the wheel than the pivotal connection between the link and the hub section.
The fact that no rivets, bolts, or loose pins are used for connecting the link to the hub and rim sections of the wheel is also a desirable feature of my construction as it reduces the liability of accidents from accidental displacement of fastening devices.

As previously stated, one of the objects of my present invention is to provide means for absorbing the shocks to which one section of the wheel is subjected when the other section is started or stopped suddenly or subjected to a twisting strain. The means which I prefer to use for accomplishing this result consists of a yielding buffer interposed between the trunnions on one end of the link 25 and the section of the wheel with which said trunnion coöperates. Various kinds of buffers can be used for this purpose such, for example, as a coiled flat spring 29 arranged in a recess in the pocket 26 so as to receive the trunnion 28 on one end of the link 25, as shown in Fig. 3, or a plurality of expansion springs 30 interposed between the trunnion 28 and the walls of the recess in the pocket 26, as shown in Fig. 4, suitable guides 31 being provided for holding said springs in proper position. By yieldingly connecting the hub and rim sections together in the manner above described I prevent the rim section from receiving sudden shocks and strains when the hub section is stopped or started quickly and thus reduce the liability of breaking the connecting means between the hub and rim sections which transmits rotary movement from one section to the other.

Another advantage of a yielding connection between the hub and rim sections is that it compensates for any uneven twisting strains which only one section of the wheel might receive when in service. And still another advantage is that it reduces the liability of shearing off the trunnions or the devices that connect the link to the hub. While I prefer to provide the wheel with a buffer or yielding device as above described,
I do not wish it to be understood that such a device is absolutely essential to the successful operation of my wheel, for, if desired, the trunnions on the link 25 can merely project into openings formed in the hub section and in the rim section, as shown in Fig. 5.

A cap or cover plate B which is connected to the ring-shaped member 15 of the rim section, forms the outer face of the wheel, said cap being detachably connected to the rim section so that it can be removed and thus enable the cushion A and rollers to be gotten at easily. Said cap is provided at its outer edge with a flange 32 which embraces one edge of the member 15 and is connected thereto by bolts or other suitable fastening devices 33, and a piece of transparent material, such, for example, as glass 34, is arranged at the center of said cap so as to expose to view a gage 35 which indicates the pressure of the air in the cushion A, said piece of glass being retained in position by means of a clamping ring 36 which fits in an internally screw-threaded flange or collar on the cap B. The gage 35 is carried by a small cap 37 which is connected to the hub 1 so as to protect the nut on the end of the axle on which the wheel is mounted, and the inflating tube 38 of the pneumatic cushion A passes through the small cap 37 and is provided with a branch 38ª which leads to the gage 35, said inflating tube also having a coupling 39 which permits the small cap 37 to be disconnected easily from the hub.

Plates 40 and 41 on the rim and hub section of the wheel prevent dirt, water and other foreign matter from getting into the interior of the wheel and, if desired, a washer-shaped piece of flexible material 42 can be arranged on the inside of said plates and connected to the hub and rim sections so as to further reduce the possibility of foreign matter working into the interior of the wheel.

By constructing the wheel in the manner above described I produce a water and dirt-proof chamber in which the pneumatic cushion is located and I am thus enabled to fill said chamber with a suitable lubricating medium that will keep the rollers thoroughly lubricated. The wheel comprises fewer parts than the wheels of this type which have heretofore been in use and as the rollers and cushion are exposed to view when the cap or cover B is removed it is a very simple matter to remove or replace said cushion and rollers. The wheel presents a neat and ornamental appearance and is comparatively light but still strong enough to withstand the strains to which it is subjected when it is in service. And still another advantage of said wheel is that the cushion and rollers are arranged in a dust and water-proof chamber that can be filled with a quantity of lubricating medium which will prevent said parts from wearing out.

Having thus described my invention, what I claim as new and desire to secure by Letters Patent is:

1. A wheel provided with relatively movable hub and rim sections arranged in the same vertical plane, a link pivotally connected to said sections at points approximately the same distance from the axis of the wheel for transmitting rotary movement from one section to the other, a cushion arranged between said sections, and a plurality of spaced bearing devices arranged between said cushion and said rim section so as to prevent said rim section from bearing throughout its entire length on said cushion.

2. A wheel provided with hub and rim sections that have vertically disposed telescoped portions which retain said sections in vertical alinement with each other, a link pivotally connected to said sections at points approximately the same distance from the axis of the wheel for transmitting rotary movement from one section to the other, a cushion interposed between said sections, and a plurality of spaced bearing devices arranged between said cushion and one of said sections and connected together in such a manner that they can travel or shift relatively to said cushion.

3. A wheel provided with a hub section and a rim section arranged in the same vertical plane, a member on one of said sections which telescopes between members on the other section and thus holds said sections in vertical alinement, one of said members being provided in its side face with a pocket, and a link arranged in said pocket between said telescoped members and pivotally connected to both of said sections for transmitting rotary movement from one section to the other.

4. A wheel comprising a hub section and a rim section that have telescoping portions, a cushion arranged between said sections, spaced bearing devices arranged between said cushion and rim section and connected together in such a manner that they can shift or travel around the cushion, a link arranged in a pocket formed in a telescoped part of one of said sections and provided with laterally projecting devices that extend into openings in the telescoped parts of said sections, and a yielding buffer coöperating with one of said laterally projecting devices for absorbing sudden shocks or strains.

5. A wheel comprising a hub section provided at one side with a pocket having vertical side walls, a rim section having a ring-shaped member provided with a felly supporting means, a plate connected to one edge of said ring-shaped member that is slidingly mounted in the pocket of said hub section, a cushion mounted on the hub section, spaced bearing devices interposed between said cushion and the ring-shaped member of the rim section, and a removable cap detachably connected to the other edge of said ring-shaped member so as to completely hide the cushion and hub section from view and form the outer side wall of the wheel, the cushion being so arranged that it can be removed after said cap has been removed.

6. A wheel having a hub section that consists of a relatively large hub, and a brake member connected to said hub and provided with radially disposed strengthening ribs, a rim section having a ring-shaped member that is provided with a corrugated plate which is telescoped between the hub and brake member of the hub section, a pneumatic cushion mounted on said hub, means for retaining said cushion in position, rollers arranged between said cushion and the ring-shaped member of the rim section and connected together in such a manner that they can travel around the cushion, a cap on one side of the wheel that is detachably connected to said rim section, and means on the other side of the wheel for preventing foreign matter from getting into the interior of the wheel.

7. A wheel comprising a hub section and a rim section that can move relatively to each other in a vertical plane, a cushion mounted on said hub section, rollers arranged between said cushion and rim section, a pair of rigid hoops having elongated slots which receive trunnions on the ends of said rollers, and means for holding said hoops in a certain position with relation to the rim section.

8. A wheel comprising a hub section and a rim section that can move relatively to each other in a vertical plane, a cushion mounted on said hub section, rollers arranged between said cushion and rim section, a pair of hoops having elongated slots which receive trunnions on the ends of said rollers, and independent rollers on said hoops which travel on said rim section.

In testimony whereof I hereunto affix my signature in the presence of two witnesses, this 14th day of July 1910.

NICHOLAS SCHENK.

Witnesses:
WELLS L. CHURCH,
GEO. R. LADSON.

---

Copies of this patent may be obtained for five cents each, by addressing the "Commissioner of Patents, Washington, D. C."